(12) United States Patent
Singh et al.

(10) Patent No.: US 8,484,450 B2
(45) Date of Patent: Jul. 9, 2013

(54) AUTHENTICATION SYSTEM FOR GAMING MACHINES AND RELATED METHODS

(75) Inventors: Anand Singh, Henderson, NV (US);
Pravinkumar Patel, Las Vegas, NV (US); Anthony E. Green, Henderson, NV (US); Raymond C. Cammilleri, Reno, NV (US); Peter R. Pitts, Sun Valley, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 605 days.

(21) Appl. No.: 12/629,859

(22) Filed: Dec. 2, 2009

(65) Prior Publication Data

US 2011/0131401 A1    Jun. 2, 2011

(51) Int. Cl.
*G06F 9/00* (2006.01)
*G06F 9/24* (2006.01)
*G06F 15/177* (2006.01)
*G06F 17/00* (2006.01)
*G06F 7/04* (2006.01)
*G08B 29/00* (2006.01)

(52) U.S. Cl.
USPC .......... 713/2; 713/1; 713/100; 726/1; 726/16; 726/34

(58) Field of Classification Search
None
See application file for complete search history.

(56) References Cited

U.S. PATENT DOCUMENTS

| | | | |
|---|---|---|---|
| 6,484,262 B1 * | 11/2002 | Herzi | 726/34 |
| 6,633,981 B1 * | 10/2003 | Davis | 713/189 |
| 7,941,623 B2 * | 5/2011 | Tankleff | 711/163 |
| 7,986,786 B2 * | 7/2011 | Ibrahim et al. | 380/277 |
| 8,103,864 B2 * | 1/2012 | Hatano | 713/2 |
| 2003/0041248 A1 * | 2/2003 | Weber et al. | 713/182 |
| 2007/0101156 A1 * | 5/2007 | Novoa et al. | 713/190 |

* cited by examiner

*Primary Examiner* — Ji H Bae
(74) *Attorney, Agent, or Firm* — Brooke Quist; Marvin Hein

(57) ABSTRACT

Various embodiments disclosed herein are directed to gaming devices having a secured basic input/output system (BIOS) and methods for determining the validity of the gaming device's BIOS. According to one embodiment, the gaming device includes a secured module for authenticating the BIOS of the gaming device. During the boot-up process, the secured module selects a challenge from a plurality of challenges, and the selected challenge is issued to the BIOS. The BIOS generates a response to the challenge, and the secured module determines whether the BIOS response matches the calculated response of the secured module. If the BIOS response matches the secured module response, the gaming device continues the boot process. Otherwise, the boot process is halted by the gaming device.

16 Claims, 7 Drawing Sheets

AUTHENTICATION SYSTEM FOR GAMING MACHINES AND RELATED METHODS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE EMBODIMENTS

An improved authentication system for gaming machines is provided. Specifically, systems and methods for validating a basic input output system of a gaming machine are provided.

BACKGROUND

Generally, content on a gaming machine is authenticated prior to authorizing the content for use. For example, authentication typically involves calculating a hash value over the data contents and then using the hash value in conjunction with a digital signature and public key to verify that the contents are valid. This authentication method may take a considerable amount of processing time especially if a large amount of data needs to be authenticated. As a result, the longer boot time for a gaming machine increases the downtime of the gaming machine and, as a consequence, reduces revenue generation.

In many gaming jurisdictions, regulatory requirements mandate that system authentication must be performed by a program running separate from the non-secure media. For gaming machines based on personal computer (PC) architecture, the basic input/output system (BIOS) must reside on the erasable programmable read-only memory (EPROM), and the authentication code executed from the BIOS EPROM. The EPROM is secured and typically is removed and independently verified and authenticated with external devices. However, if the authentication process of the EPROM is compromised, the non-secure media may not be properly authenticated, thereby allowing rogue code to be run on the gaming machine. Accordingly, there is a need to ensure the proper authentication of a secured EPROM.

SUMMARY

Briefly, and in general terms, various embodiments are directed to gaming devices having a secured basic input/output system (BIOS) and methods for determining the validity of the gaming device's BIOS. According to one embodiment, the gaming device includes a secured module for authenticating the BIOS of the gaming device. During the boot-up process, the secured module issues a challenge to the BIOS. The BIOS generates a response to the challenge, and the secured module determines whether the BIOS response matches the calculated response of the secured module. If the BIOS response matches the secured module response, the gaming device continues the boot process. Otherwise, the boot process is halted by the gaming device.

In another embodiment, the gaming device includes a gaming processor, a basic input output system (BIOS) for running gaming software, one or more game displays for presenting a game to a player, and a secured module for validating the BIOS. The secured module is a one-time programmable hardware component that includes a security algorithm for generating a challenge to the BIOS and evaluating a response calculated by the BIOS.

The BIOS of the gaming machine may be validated according to the following method. In this method, a boot process for a gaming machine is initiated, and a secured module is initialized. The secured module is a one-time programmable component and is hardwired to the gaming machine. The secured module only authenticates the BIOS of the gaming machine. Once the secured module is initialized, the secured module selects a challenge from a set of challenges. The selected challenge is then issued to the BIOS of the gaming machine. The secured module also calculates an expected response for the selected challenge. The boot process for the gaming machine is continued when the response generated by the BIOS is the same as the expected response calculated by the secured module.

In another method, a boot process for a gaming machine is initiated, and a field processor gate array is initialized. The field processor gate array includes a security algorithm for authenticating the BIOS of the gaming machine. A challenge is generated by the field processor gate array, and the challenge is issued to the BIOS. The field processor gate array also determines an expected response by the using the security algorithm. A response received from the BIOS is evaluated against the expected response calculated by the field processor gate array. The boot process for the gaming machine is continued if the response from the BIOS and the expected response match.

Other features and advantages will become apparent from the following detailed description, taken in conjunction with the accompanying drawings, which illustrate by way of example, the features of the various embodiments.

DETAILED DESCRIPTION

Various embodiments disclosed herein are directed to gaming devices having a secured basic input/output system (BIOS) and methods for determining the validity of the gaming device's BIOS. According to one embodiment, the gaming device includes a secured module for authenticating the BIOS of the gaming device. During the boot-up process, the secured module selects a challenge from a plurality of challenges, and the selected challenge is issued to the BIOS. The BIOS generates a response to the challenge, and the secured module determines whether the BIOS response matches the calculated response of the secured module. If the BIOS response matches the secured module response, the gaming device continues the boot process. Otherwise, the boot process is halted by the gaming device.

The secured module provides an additional level of protection in the authentication process for a gaming device. The secured module provides a hardware level of authentication for the BIOS of the gaming device. The secured module includes an algorithm to self-authenticate the BIOS of the gaming device. The secured module checks that the BIOS is valid and not whether the software on the gaming device has been changed. The validity of the BIOS is defined as whether the BIOS on the gaming device is the original BIOS placed on the gaming device. In other words, the BIOS has been changed or has been otherwise compromised, the BIOS is not valid. For example, in one embodiment, the secured module determines whether the BIOS in use in the gaming device is a BIOS provided by Bally, Inc. By incorporating and using the secured module, the entire sequence of booting a gaming device is a secured and authenticated process.

Figure 1:
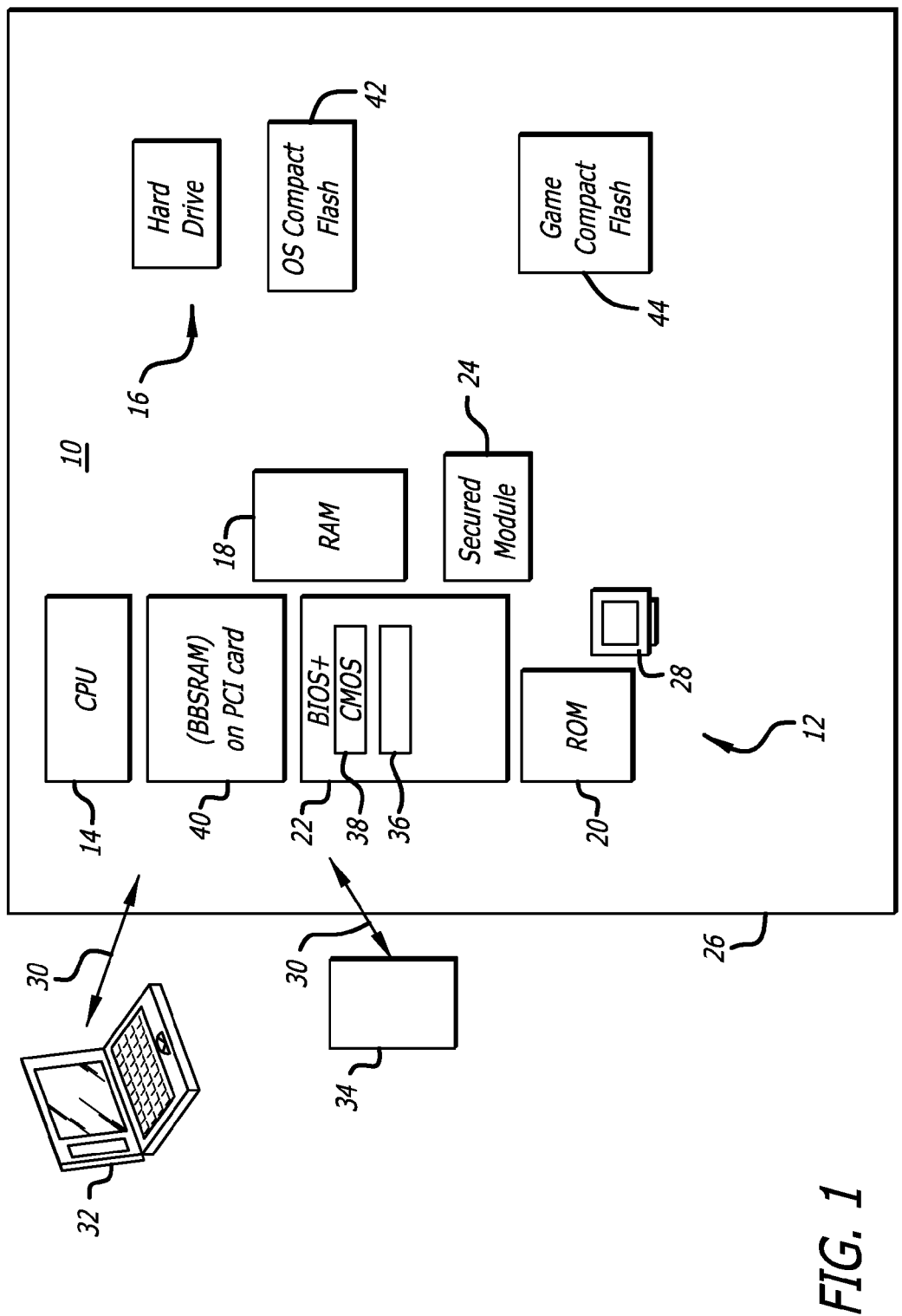
FIG. 1 is a flow chart of one method for validating a BIOS of a gaming device.

Referring now to the drawings, wherein like reference numerals denote like or corresponding parts throughout the drawings and, more particularly to FIGS. 1-5, there are shown various embodiments of a gaming device having a validated BIOS and methods for determining the validity of the gaming device's BIOS. FIG. 1 illustrates a block diagram of the components 12 of a gaming device 10.

The components 12 comprise, for example, and not by way of limitation, software or data file components, firmware components, hardware components, or structural components of the gaming machine 10. These components include, without limitation, one or more processors 14, a hard disk device 16, volatile storage media such as random access memories (RAMs) 18, read-only memories (ROMs) 20 or electrically erasable programmable ROMs (EEPROMS) such as basic input/output systems (BIOS) 22. Additionally, the gaming device 10 includes a secured module 24. The secured module is a hardware component that is one-time programmable. One or more security algorithms may be provided on the secured module. The security algorithm generates a challenge (e.g., generates a random number), calculates an expected response to the challenge, and determines the validity of the BIOS based on the response to the challenge provided by the BIOS. In one embodiment, the secured module is a field-programmable gate array (FPGA). In another embodiment, the secured module is a trusted platform module (TPM).

In one embodiment, components 12 also include data files (which are any collections of data, including executable programs in binary or script form, and the information those programs operate upon), gaming machine cabinets (housings) 26, displays 28, or compact disk read only memory (CDROM) or CD read-write (CR-RW) storage. In one embodiment, the data files may include data storage files, software program files, operating system files, and file allocation tables or structures. Ports 30 are be included with the gaming machine 10 for connection to diagnostic systems 32 and other input/output devices 34. In one embodiment, the ports 30 each comprise a serial port, universal serial bus (USB) port, parallel port or any other type of known port, including a wireless port. Preferably, each of the components 12 have embedded or loaded in them identification numbers or strings that can be accessed by the processor 14, including the processor 14 itself, which are utilized for authentication as explained below. In embodiment, the components that are data files each use their file path and name as their identification number or string.

Either within the gaming machine 10, or in the diagnostic system 32 attachable to the gaming machine 10, are executable instructions or a software program 36 for authentication of the components (authentication software 36), which itself may be one of the components 12 to authenticate if it is internal to the gaming machine 10. In one embodiment, authentication software 36 is stored on a persistent storage media such as the hard disk device 16, ROM 20, EEPROM, in a complementary metal oxide semiconductor memory (CMOS) 38, in safe ram comprising a battery-backed static random access memory (BBSRAM) 40, in flash memory components 42, 44, or other type of persistent memory. In one embodiment, the authentication software 36 is stored in a basic input/output system (BIOS) 22 device or chip. BIOS chips 22 have been used for storing prior authentication software, such as previous versions of the BIOS+ chip used by Bally Gaming Systems, Inc. of Las Vegas, Nev. in their EVO gaming system. Placing the authentication software 36 in the BIOS 22 is advantageous because the code in the BIOS 22 is usually the first code executed upon boot or start-up of the gaming machine 10, making it hard to bypass the authentication process. Alternatively, in one embodiment, the authentication software 36 is stored in a firmware hub (FWH), such as Intel's 82802 FWH.

As alternative, instead of, or in conjunction with, the hard disk device 100, another mass storage device is used, such as a CD-ROM, CD-RW device, a WORM device, a floppy disk device, a removable type of hard disk device, a ZIP disk device, a JAZZ disk device, a DVD device, a removable flash memory device, or a hard card type of hard disk device.

It should be noted that the term gaming device is intended to encompass any type of gaming machine, including handheld devices used as gaming machines such as cellular based devices (e.g. phones), PDAs, or the like. The gaming device can be represented by any network node that can implement a game and is not limited to cabinet based machines. The system has equal applicability to gaming machines implemented as part of video gaming consoles or handheld or other portable devices. In one embodiment, a geo-location device in the handheld or portable gaming device may be used to locate a specific player for regulatory and other purposes. Geo-location techniques that can be used include by way of example, and not by way of limitation, IP address lookup, GPS, cell phone tower location, cell ID, known Wireless Access Point location, Wi-Fi connection used, phone number, physical wire or port on client device, or by middle tier or backend server accessed. In one embodiment, GPS and biometric devices are built within a player's client device, which in one embodiment, comprises a player's own personal computing device, or provided by the casino as an add-on device using USB, Bluetooth, IRDA, serial or other interface to the hardware to enable jurisdictionally compliant gaming, ensuring the location of play and the identity of the player. In another embodiment, the casino provides an entire personal computing device with these devices built in, such as a tablet type computing device, PDA, cell phone or other type of computing device capable of playing system games.

Figure 2:
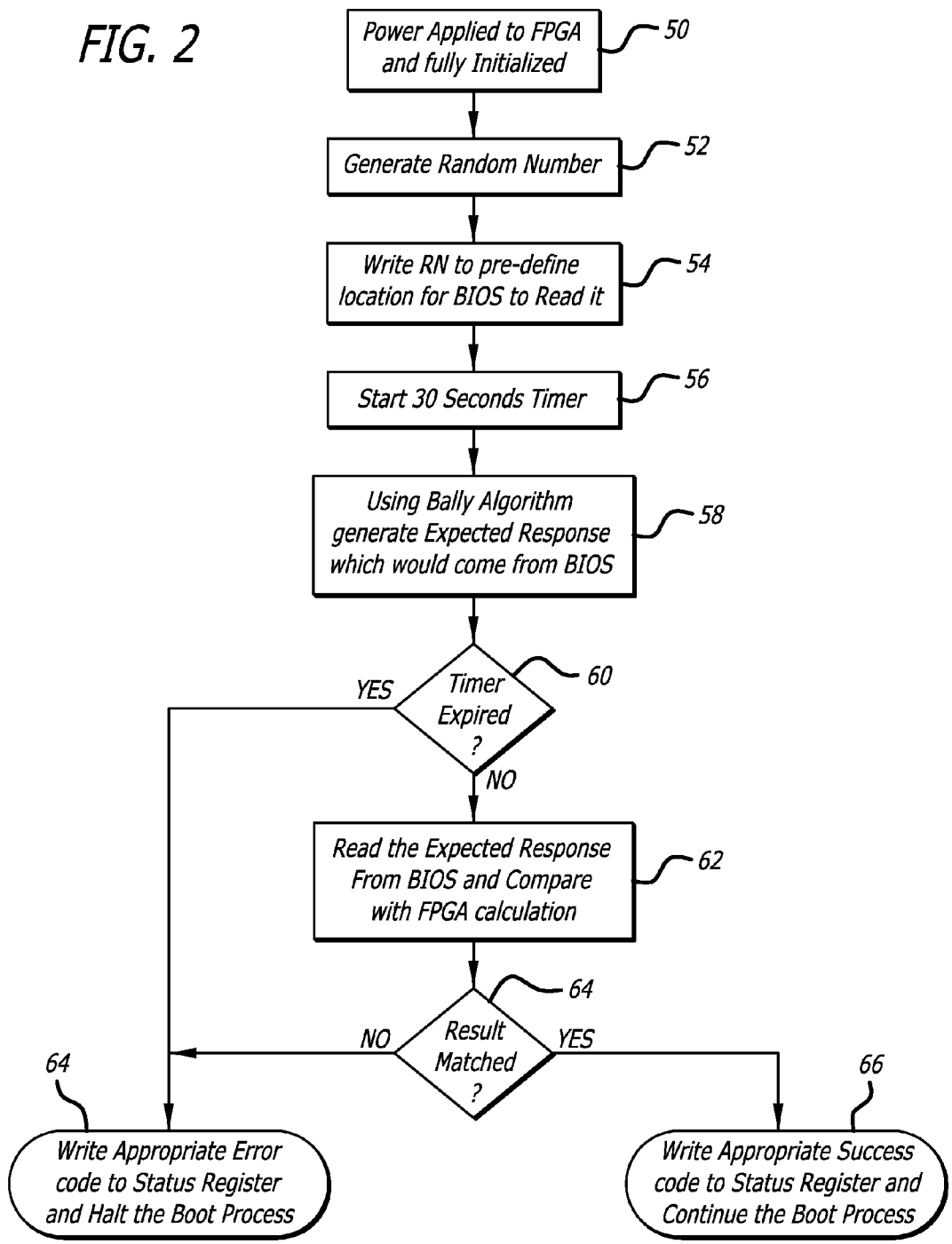
FIG. 2 illustrates one method of validating the BIOS of the gaming device.

FIG. 2 illustrates one method of validating the BIOS of the gaming device 10. At step 50, the power is applied to the secured module, and the module is initialized. The secured module generates a random number at step 52, and the random number is written to a predefined location for the BIOS to read at step 54. As shown in the method of FIG. 2, a timer is initiated at step 56. In various methods, the length of the timer may be ten, twenty, thirty, or sixty seconds. Alternatively, other methods may eliminate the timer. At step 58, the secured module uses an algorithm provided on the secured module to generate the expected response from the BIOS. While not shown in FIG. 2, the BIOS is generating a response based upon the random number. If the timer has expired (i.e., the timer ends and the BIOS has not generated a response), then the secured module writes an error code to the status register of the gaming machine at step 64. Accordingly, the boot process for the gaming device is stopped. If the timer is not expired, the secured module compares its calculated response to the response calculated by the BIOS at step 62. If the responses match, a success code is written to the status register and the boot process continues at step 66. If the responses do not match, the secured module writes an error code to the status register of the gaming machine and the boot process is stopped at step 64.

Once the BIOS is validated, the boot process is continued and the software running on the BIOS may then be authenticated. For example, the gaming device may be authenticated using the systems and methods disclosed in U.S. patent application Ser. No. 11/739,078, filed Apr. 23, 2008, entitled Improved Authentication System for Gaming Machines, which is hereby incorporated by reference in its entirety. In one embodiment, a Pintsov Vanstone Signature Scheme with partial message Recovery (PVSSR) algorithm provides a computationally efficient means of authenticating manifests and the contained components. A manifest is digitally signed with a PVSSR signature, calculated with a private key across the manifest data; authentication is performed when a public key is used to evaluate the signature over the manifest data. The use of private key and the intrinsic nature of the PVSSR algorithm assure that only the owner of the private key can sign the manifest data and result in successful authentication with the public key. The manifest contains records that correspond to components that can be authenticated. A component can be, but not limited to, a block of data, a file, a sector on a hard drive, or a partition of a hard drive. Each record in the manifest joins a component with a corresponding PVSSR signature for the component data.

In an alternate embodiment, a hash value is substituted for the PVSSR signature in the component record. This method provides a measure of trust that the component's signature value as measure of authentication because the manifest data is signed with a PVSSR signature, which is authenticated before the signature values are used.

In another embodiment, all manifests are authenticated prior to authenticating the components referenced within each manifest. This method results in bulk authentication of all of the components with the manifests before any of the components may be used.

According to another preferred embodiment, the components are authenticated on an as-needed basis, allowing for quicker boot times because only the components that are loaded are authenticated. This results in quicker system loading times, and through definition of the manifest components, better control over what components are authenticated and when such components are authenticated.

Figure 3:
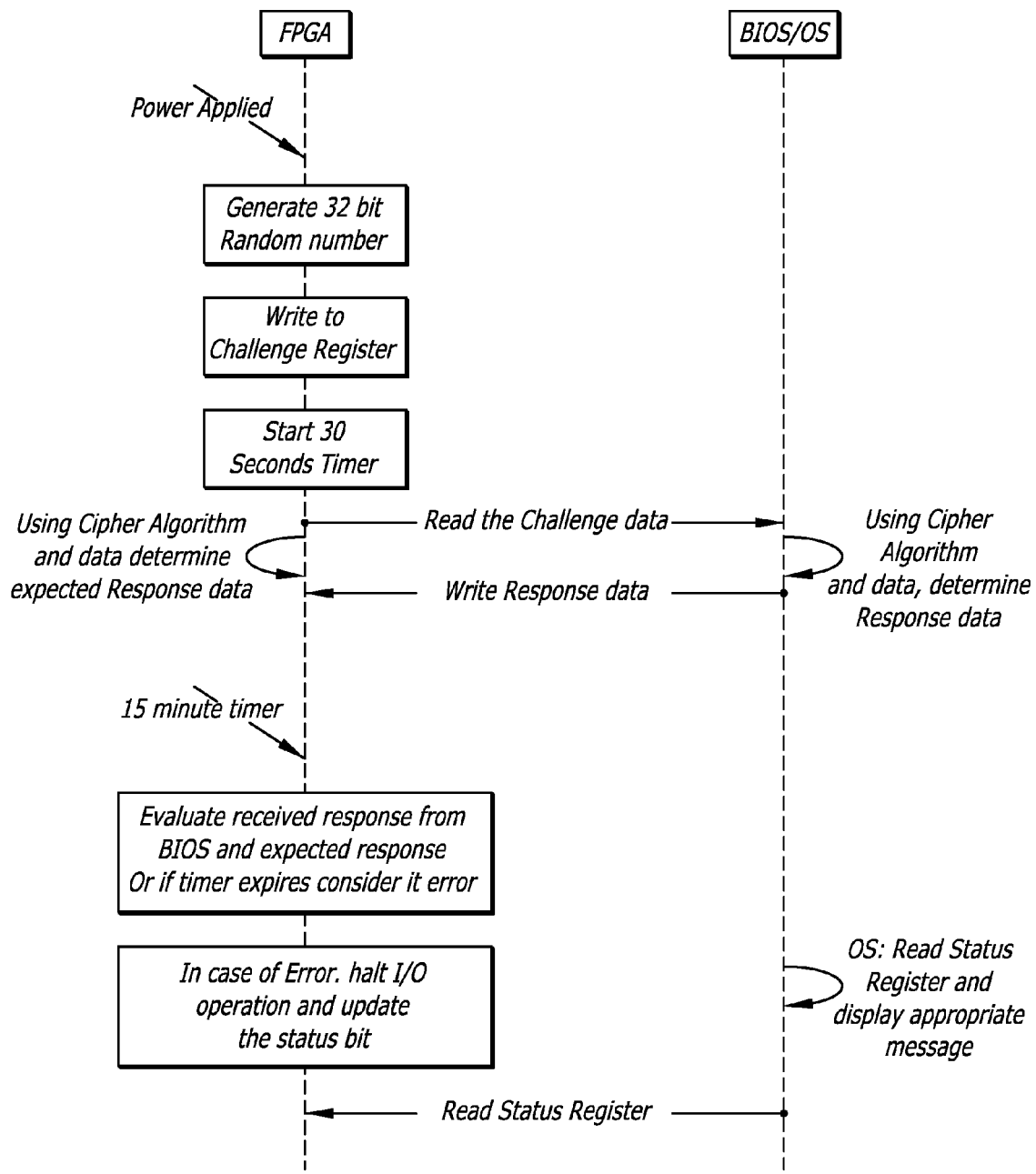
FIG. 3 is a sequence diagram of one method of validating a BIOS of a gaming device.

FIG. 3 is a sequence diagram of one method of validating a BIOS of a gaming device. As shown in FIG. 3, power is applied to the secured module. The secured module generates a 32-bit random number, which is written to a challenge register. The secured module then starts a timer. The secured module reads the challenge data, and a cipher algorithm associated with the secured module is used to determine the expected response based on the challenge data. Similarly, the BIOS reads the challenge data from the challenge register.

The BIOS uses a cipher algorithm associated with the BIOS to determine response data. The cipher algorithm includes a cipher code and a key, which is generally a prime number. In one embodiment, the response is the product of the challenge and the key. For each character in the cipher code, a circular shift response 4 bits to the left is executed. The last byte of the response may have a XOR encryption performed with the cipher code byte. As those skilled in the art will appreciate, other cipher algorithms may be used to generate the challenge and to provide a response.

The BIOS then writes the response data to a predetermined location for the secured module to read. As shown in FIG. 3, a fifteen minute timer is initiated by the secured module. As those skilled in the art will appreciate, a timer of any duration (or no timer at all) may be used by the secured module. The secured module evaluates the response from the BIOS to the expected response calculated by the secured module. If the BIOS response is incorrect or the timer expires, the secured module halts any input/output operation and updates the status bit to reflect an error. The operating system reads the status register and displays the appropriate message.

Figure 4:
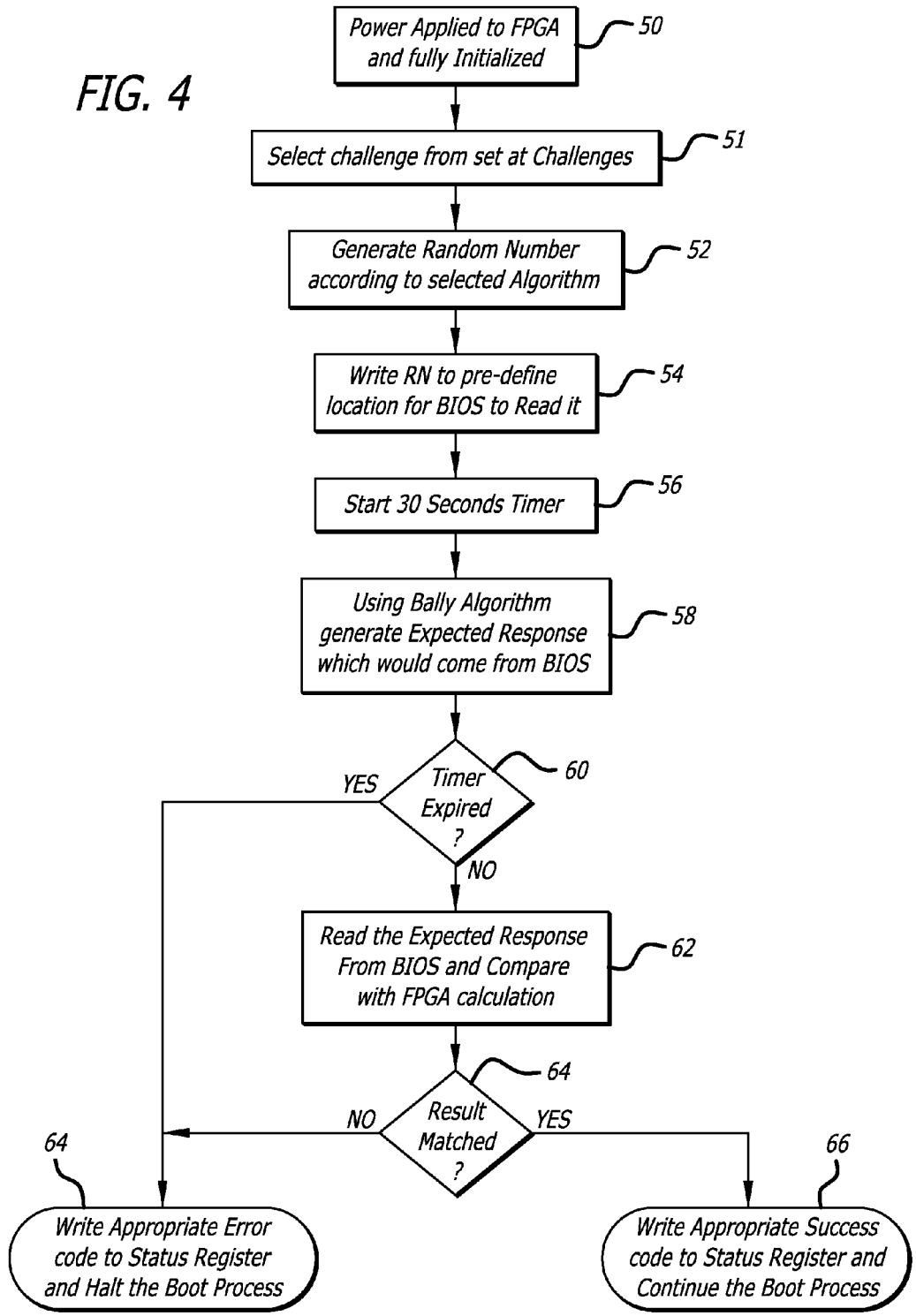
FIG. 4 is flow chart of another method of validating a BIOS of a gaming device.

FIG. 4 is flow chart of another method of validating a BIOS of a gaming device. This method is similar to the method shown in FIG. 1 except that the secured module includes a plurality challenges that may be issued to the BIOS. As shown in FIG. 4, a challenge is selected from a set of challenges that are stored on the secured module at step 51. Typically, the challenge may be randomly selected from the set of challenges. In one method, a single challenge is selected and then issued to the BIOS. In another method, a plurality of challenges may be issued to the BIOS. In this method, the challenges may be issued sequentially or all at once. In yet another method, all the challenges provided on the secured module are issued to the BIOS. In any embodiment, each of the challenges will have an identifier that allows the BIOS to select the appropriate key and/or algorithm to respond to the challenge.

Figure 5:
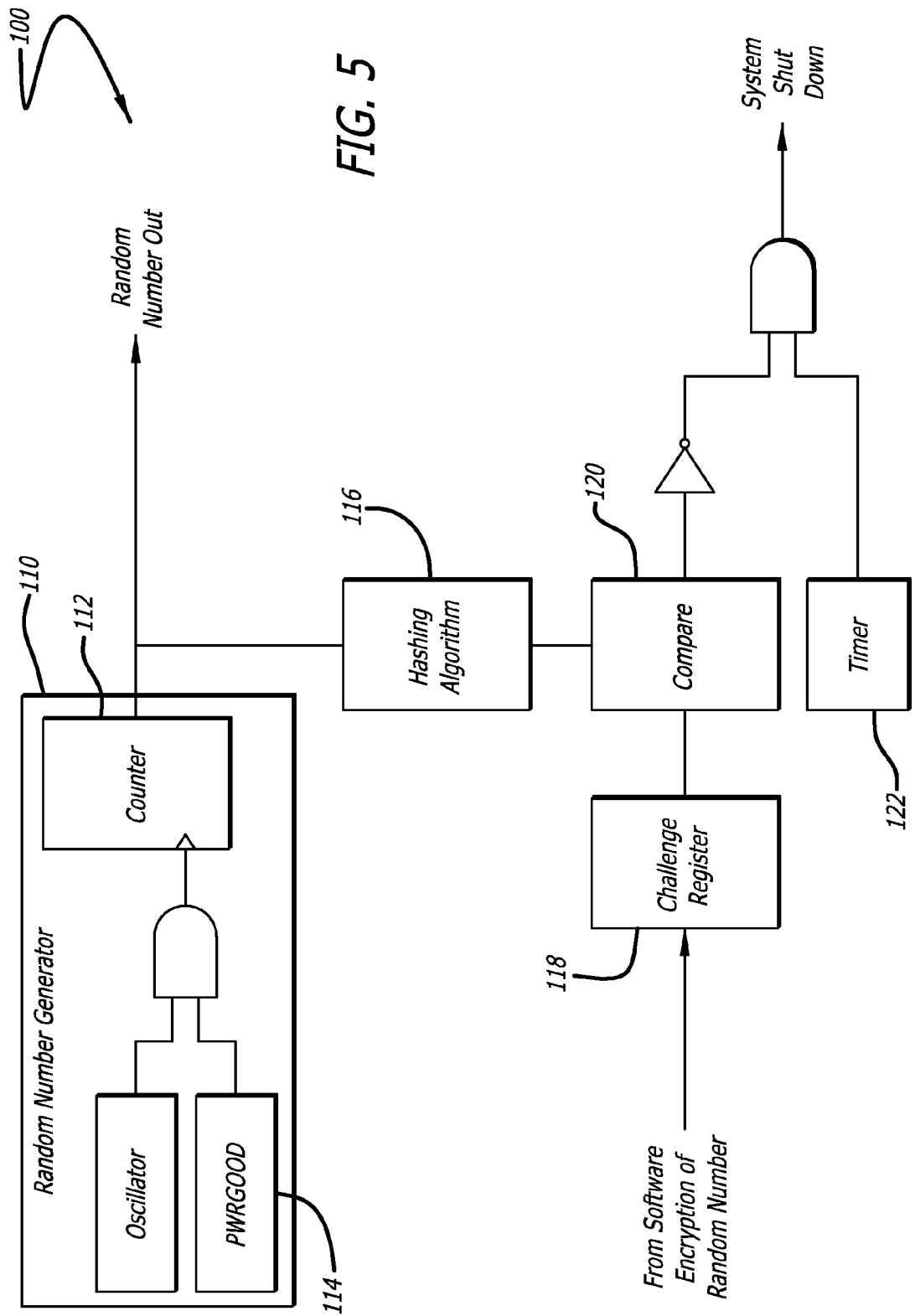
FIG. 5 is a block diagram of yet another method for validating a BIOS of a gaming device.

FIG. 5 is flow diagram of another method for validating a BIOS of a gaming device. The random number generator 102 is a hardware component in the gaming device 10. The random number generator 102 uses a free running counter 112 and the gaming device's Power Good (PWRGOOD) signal 114 to generate a random number. The free running counter 112 starts incrementing immediately upon power-up and stops when the PWRGOOD 114 becomes active. The PWRGOOD signal 114 becomes active when the various power supply outputs reach a particular tolerance. The timing in which PWRGOOD becomes active is not definitive so there is a degree of randomness. When the PWRGOOD is activated, the counter 112 is stopped and the number from the counter is used as a random number.

Once the random number is generated, the challenge algorithm encrypts the random number at step 116. The random number is also encrypted by a software algorithm and the value is written to a challenge register 118. The values generated by the hardware and software algorithms are then compared at step 120. If the values generated by the algorithms agree, the timeout timer 122 is disabled and the system does not shut down after a predetermined period of time. If the value generated by the software hash does not match the hardware's hashing algorithm, the gaming device locks up. Alternatively, if the calculated value is not written to the challenge register 118 before the end of the timeout period, the gaming device also locks-up.

Figure 6:
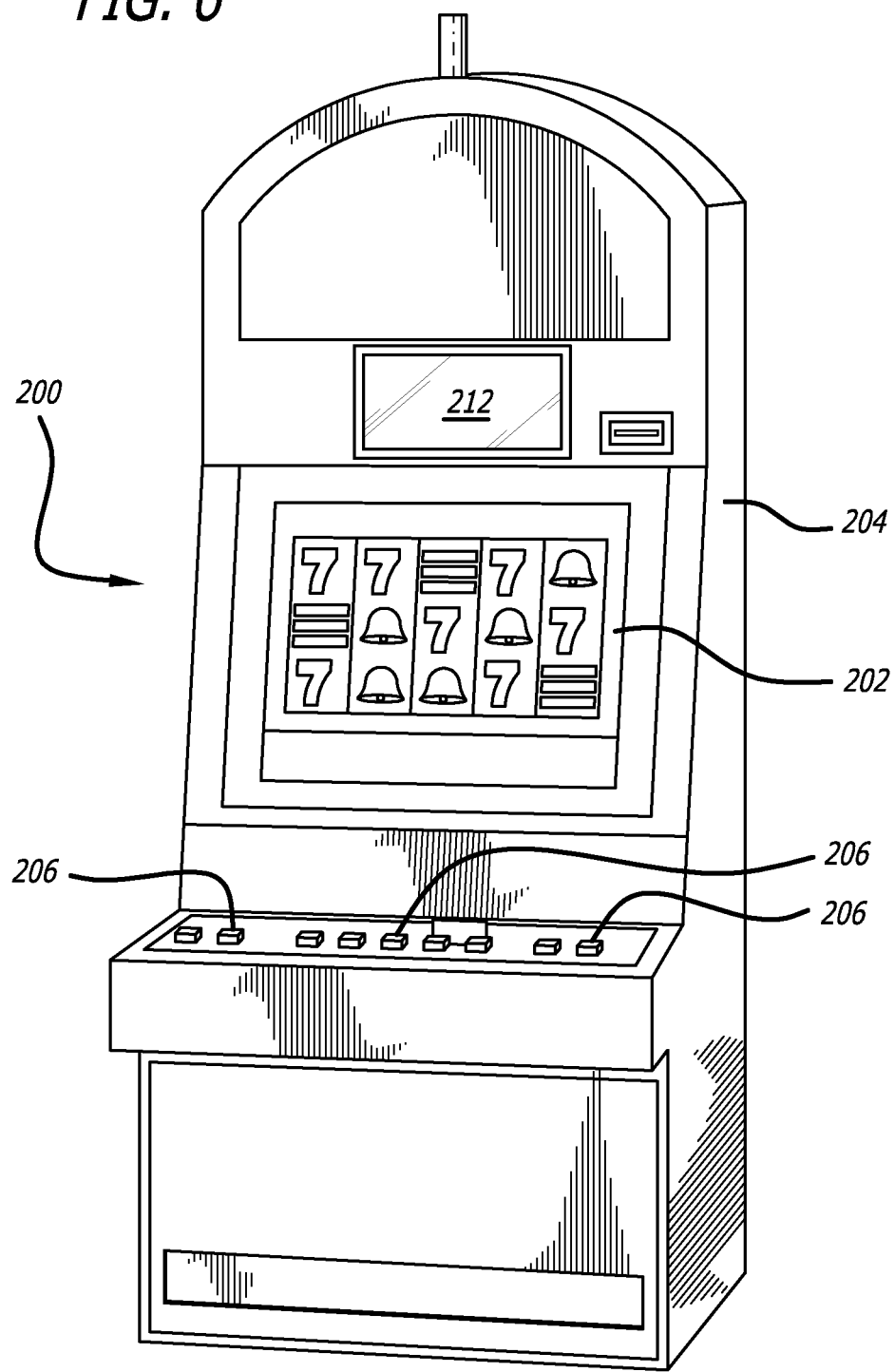
FIG. 6 illustrates one embodiment of a gaming device including the secured module for validating the BIOS.

FIG. 6 illustrates one embodiment of a gaming device including the secured module for validating the BIOS. As shown in FIG. 6, the main cabinet 204 of the gaming machine 200 is a self-standing unit that is generally rectangular in shape. In another embodiment, the main cabinet 204 may be a slant-top gaming cabinet. Alternatively, in other embodiments, the gaming cabinet may be any shaped cabinet known or developed in the art that may include a top box. Additionally, the cabinet may be manufactured with reinforced steel or other rigid materials that are resistant to tampering and vandalism. Optionally, in an alternate embodiment, the gaming machine 200 may instead be a cinema-style gaming machine (not shown) having a widescreen display, as disclosed in U.S. application Ser. No. 11/225,827, entitled "Ergonomic Gaming Cabinet," filed on Sep. 12, 2005, which is hereby incorporated by reference.

As shown in FIG. 6, the gaming machine 200 includes a main display 202. According to one embodiment, the main display 202 is a plurality of mechanical reels for presenting a slot-style game. Alternatively, the main display 202 is a video display for presenting one or more games such as, but not limited to, mechanical slots, video slots, video keno, video poker, video blackjack, video roulette, Class II bingo, games of skill, games of chance involving some player skill, or any combination thereof.

According to one embodiment, the main display 202 is a widescreen display (e.g., 16:9 or 16:10 aspect ratio display). In one embodiment, the display 202 is a flat panel display including by way of example only, and not by way of limitation, liquid crystal, plasma, electroluminescent, vacuum fluorescent, field emission, LCOS (liquid crystal on silicon), and SXRD (Silicon Xtal Reflective display), or any other type of panel display known or developed in the art. These flat panel displays may use panel technologies to provide digital quality images including by way of example only, and not by way of limitation, EDTV, HDTV, or DLP (Digital Light Processing).

According to one embodiment, the widescreen display 202 may be mounted in the gaming cabinet 204 in a portrait or landscape orientation. In another embodiment, the game display 202 may also include a touch screen or touch glass system (not shown). The touch screen system allows a player to input choices without using any electromechanical buttons 206. Alternatively, the touch screen system may be a supplement to the electromechanical buttons 206.

The main cabinet 204 of the gaming machine also houses a game management unit (not shown) that includes a CPU, circuitry, and software for receiving signals from the player-activated buttons 206 and a handle (not shown), operating the games, and transmitting signals to the respective game display 206 and speakers (not shown). Additionally, the gaming machine includes an operating system such as Bally Gaming's Alpha operating system (OS), as disclosed in U.S. Pat. No. 7,278,068, which is hereby incorporated by reference.

In various embodiments, game program may be stored in a memory (not shown) comprising a read only memory (ROM), volatile or non-volatile random access memory (RAM), a hard drive or flash memory device or any of several alternative types of single or multiple memory devices or structures.

As shown in FIG. 6, the gaming machine 200 includes a plurality of player-activated buttons 206. These buttons 206 may be used for various functions such as, but not limited to, selecting a wager denomination, selecting a number of games to be played, selecting the wager amount per game, initiating a game, or cashing out money from the gaming machine 200. The buttons 206 function as input mechanisms and may include mechanical buttons, electromechanical buttons or touch screen buttons. In another embodiment, one input mechanism is a universal button module that provides a dynamic button system adaptable for use with various games, as disclosed in U.S. application Ser. No. 11/106,212, entitled "Universal Button Module", filed Apr. 14, 2005 and U.S. application Ser. No. 11/223,364, entitled "Universal Button Module", filed Sep. 9, 2005, which are both hereby incorporated by reference. Additionally, other input devices, such as but not limited to, touch pad, track ball, mouse, switches, and toggle switches, are included with the gaming machine to also accept player input. Optionally, a handle (not shown) may be "pulled" by a player to initiate a slots-based game.

One of ordinary skill in the art will appreciate that not all gaming devices will have all these components or may have other components in addition to, or in lieu of, those components mentioned here. Furthermore, while these components are viewed and described separately, various components may be integrated into a single unit in some embodiments.

In some embodiments, the gaming machine 200 is part of a gaming system connected to or with other gaming machines as well as other components such as, but not limited to, a Systems Management Server (SMS) and a loyalty club system (e.g., casino management personnel/system (CMP/CMS)). Typically, the CMS/CMP system performs casino player tracking and collects regular casino floor and player activity data. The gaming system may communicate and/or transfer data between or from the gaming machines 200 and other components (e.g., servers, databases, verification/authentication systems, and/or third party systems).

Figure 7:
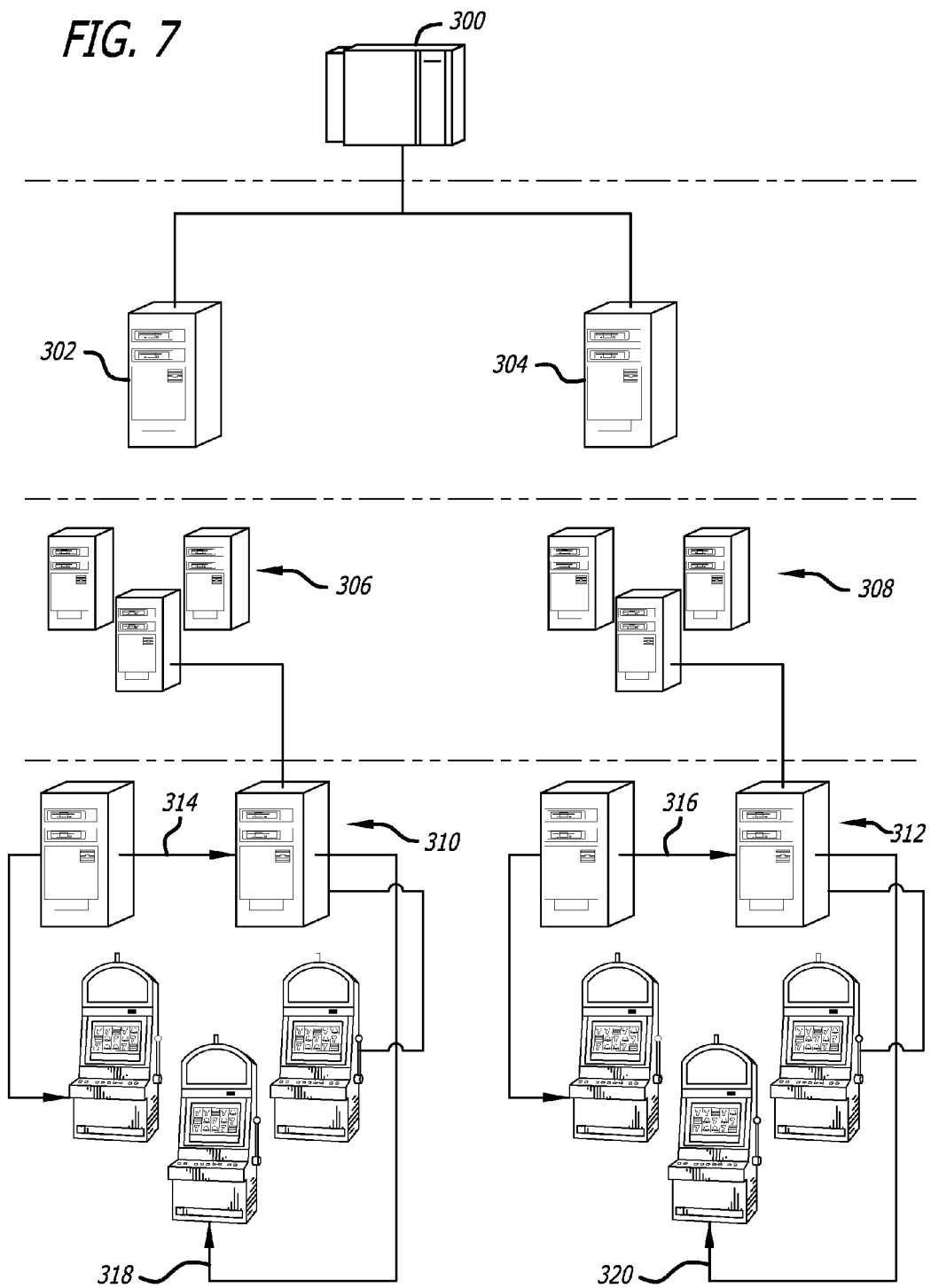
FIG. 7 illustrates one embodiment of a gaming system network including the gaming devices of FIG. 6.

An embodiment of a network that may be used with the system is illustrated in FIG. 7. The example network consists of a top level vender distribution point 300 that contains all packages for all jurisdictions, one or more Jurisdiction distribution points 302 and 304 that contain regulator approved production signed packages used within that jurisdiction or sub-jurisdiction, one or more Software Management Points 306 and 308 to schedule and control the downloading of packages to the gaming machine and a one or more Software Distribution Points 310 and 312 that contain regulator approved production signed packages only used in the gaming establishment that it supports. The Software Distribution Points (SDPs) 310 and 312 can communicate with Systems Management Points (SMPs) 314 and 316, respectively as well as directly to one or more gaming machines 318 and 320. The system allows for rapid and secure distribution of new games, configurations, and OS's from a centralized point. It makes it possible to update and modify existing gaming machines with fixes and updates to programs as well as providing modifications to such files as screen images, video, sound, pay tables and other gaming machine control and support files. It provides complete control of gaming machines from a centralized control and distribution point and can minimize the need and delay of human intervention at the gaming machine. In one embodiment, the configuration control may be from the SDPs 101 or 104 or from the gaming servers 103.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A method for validating a basic input output system (BIOS) for a gaming machine, the method comprising:
   initiating a single boot process for a gaming machine;
   initializing a field processor gate array having a security algorithm for authenticating the BIOS of the gaming machine;
   generating a challenge by the field processor gate array to the BIOS during the single boot process;
   determining an expected response by the field processor gate array using the security algorithm;

evaluating a response received from the BIOS and the expected response from the field processor gate array during the single boot process; and continuing the single boot process for the gaming machine if the response from the BIOS and the expected response match.

2. The method of claim 1, wherein generating the challenge by the field processor gate array further comprises:

generating a random number by the field processor gate array; and writing the random number to a predefined location, wherein the BIOS is capable of reading the random number.

3. The method of claim 2, further comprising associating an identifier with the challenge.

4. The method of claim 1, further comprising:

initiating a timer after the challenge is generated by the field processor gate array; and halting the single boot process for the gaming machine if the timer has expired.

5. The method of claim 1, further comprising generating the challenge by selecting the challenge from a group of challenges.

6. A method for validating a basic input output system (BIOS) for a gaming machine, the method comprising:

initiating a single boot process for a gaming machine;

initializing a secured module for only authenticating the BIOS of the gaming machine, wherein the secured module is a one-time programmable component and is hard-wired to the gaming machine;

selecting a challenge from a set of challenges at the secured module during the single boot process;

issuing the selected challenge to the BIOS of the gaming machine;

calculating an expected response for the selected challenge by the secured module; and continuing the single boot process for the gaming machine when a response generated by the BIOS is the same as the expected response calculated by the secured module.

7. The method of claim 6, wherein the secured module is a field processor gate array.

8. The method of claim 6, wherein the secured module is a trusted platform module.

9. The method of claim 6, wherein selecting the challenge from the set of challenges further comprises:

selecting an algorithm for generating a random number;

generating the random number using the selected algorithm; and writing the random number to a predefined location, wherein the BIOS is capable of reading the random number.

10. The method of claim 6, wherein selecting the challenge from the set of challenges further comprises associating an identifier with the challenge.

11. The method of claim 6, further comprising:

initiating a timer after the challenge is selected by the secured module; and halting the single boot process for the gaming machine if the timer has expired.

12. The method of claim 6, further comprising:

selecting a second challenge from set of challenges at the secured module; and issuing the second challenge to the BIOS of the gaming machine.

13. A gaming device, comprising:

a gaming processor;

one or more game displays for presenting a game to a player;

a basic input output system (BIOS) for running gaming software;

a secured module for validating the BIOS, wherein the secured module is a one-time programmable hardware component, and the secured module is programmed to execute, in a single booting process, a security algorithm for:

generating a challenge to the BIOS, calculating an expected response, and evaluating a response calculated by the BIOS.

14. The gaming device of claim 13, wherein the secured module is a field processor gate array.

15. The gaming device of claim 13, wherein the secured module is a trusted platform module.

16. The gaming device of claim 13, further comprising one or more communication ports for connecting to one more systems or input/output devices.

* * * * *